(12) United States Patent
Yamaguchi

(10) Patent No.: US 6,295,064 B1
(45) Date of Patent: *Sep. 25, 2001

(54) IMAGE PERSPECTIVE CONTROL FOR VIDEO GAME IMAGES

(75) Inventor: Makoto Yamaguchi, Amagasaki (JP)

(73) Assignee: Konami Co., Ltd., Hyogen-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,336

(22) Filed: Mar. 31, 1998

(30) Foreign Application Priority Data

Apr. 3, 1997 (JP) .................................................. 9-085387

(51) Int. Cl.⁷ .................................................. G06T 15/00
(52) U.S. Cl. ........................... 345/419; 345/427; 348/36; 348/169
(58) Field of Search .................................... 345/121, 123, 345/124, 145, 157, 327, 355, 341, 427, 974, 419; 348/36, 169

(56) References Cited

U.S. PATENT DOCUMENTS

| 5,129,054 | * | 7/1992 | Alstad et al. ........................... 395/155 |
| 5,414,474 | * | 5/1995 | Kamada et al. ........................ 348/169 |
| 5,434,617 | * | 7/1995 | Bianchi ................................. 348/170 |
| 5,610,653 | * | 3/1997 | Abecassis ............................. 348/110 |
| 5,611,060 | * | 3/1997 | Belfiore et al. ....................... 395/341 |
| 5,714,999 | * | 2/1998 | Jeong et al. .......................... 348/169 |

FOREIGN PATENT DOCUMENTS

| 0378271 | 1/1990 | (DE) . |
| WO97/03417 | 1/1997 | (DE) . |
| 0841640 | 5/1998 | (DE) . |
| 07178242 | 7/1995 | (JP) . |
| 08221600 | 8/1996 | (JP) . |

* cited by examiner

Primary Examiner—Cliff N. Vo
(74) Attorney, Agent, or Firm—Jordan and Hamburg LLP

(57) ABSTRACT

The perspective of a displayed video game image is moved in order to bring an attentional subject into a hypothetical focus frame, and the focus frame is moved back to a rear position on an extension opposite to the direction in which the attentional subject moves, for providing a wide area in front of the attentional subject in the direction in which it moves, and the attentional subject is brought into the moved focus frame. The rear position is a position in which a central reference point of the focus frame is located on a boundary line of the circular center movement range when the central reference point is moved opposite and parallel to the direction in which the attentional subject moves. The wide area provided in front of the attentional subject in the direction in which it moves, provides enough room for maneuver for the game player to take an action easily even when an opponent game character suddenly pops up in the displayed video game image.

16 Claims, 7 Drawing Sheets

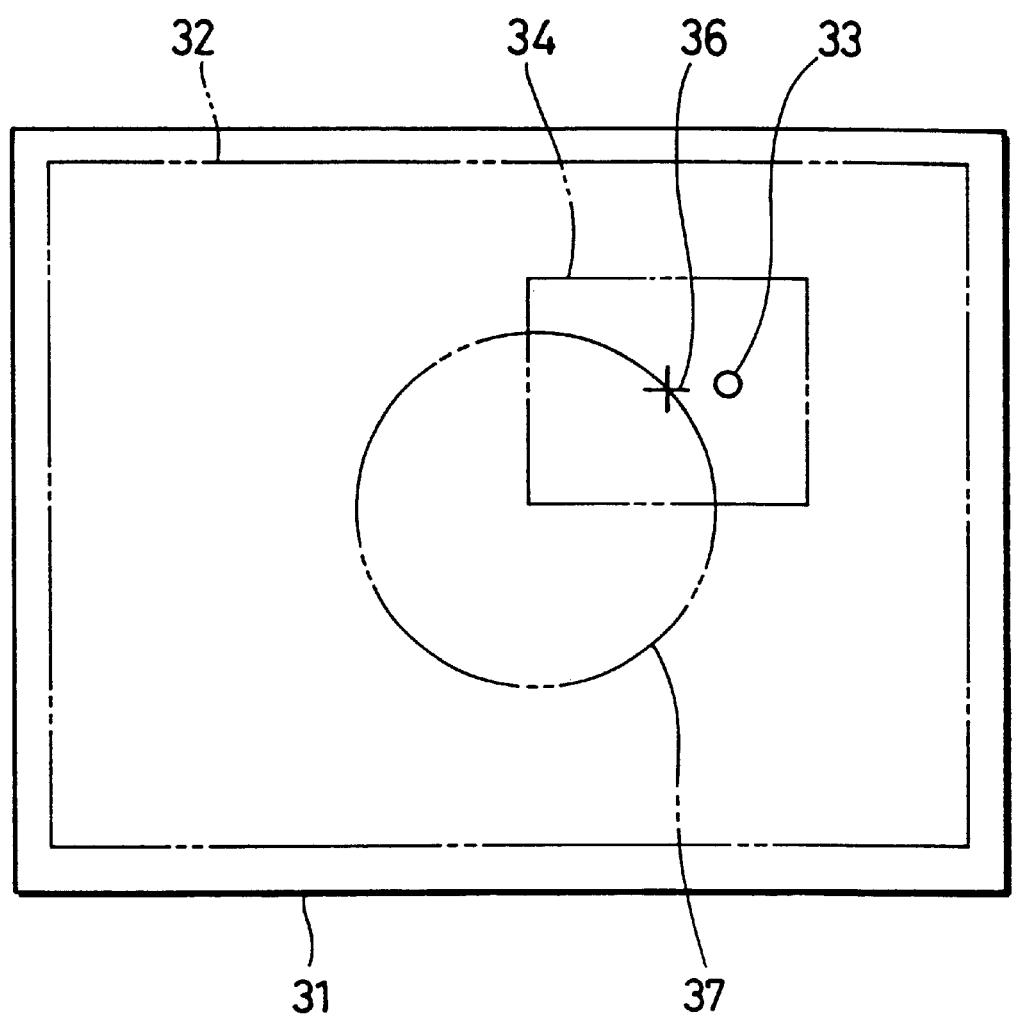

IMAGE PERSPECTIVE CONTROL FOR VIDEO GAME IMAGES

BACKGROUND OF THE INVENTION

1. Field of the Invention

The present invention relates to an apparatus for and a method of displaying a video game image while moving its perspective in the direction in which a subject such as an attentional game character moves in the video game image, and a recording medium which stores a control program for displaying a video game image while moving its perspective in the direction in which a subject such as an attentional game character moves in the video game image.

2. Description of the Prior Art

Video game apparatus which display a video game image on a display screen are required to move the perspective of the video game image in the direction in which a subject such as an attentional game character moves in the video game image, in order that the subject will remain displayed within the video game image. In another displayed video game image, a moving attentional game character as if captured by a video camera positioned directly behind the attentional game character is displayed such that the attentional game character is looking forward in the background.

When moving the perspective of a video game image in the direction in which an attentional game character moves, the area displayed in front of the moving attentional game character within the video game image becomes very small, providing little room for maneuver for the game player. For example, if an opponent game character suddenly pops up in the small area in front of the attentional game character, then the game player does not have a sufficient time to avoid the opponent game character.

When a moving attentional game character displayed as if captured by a hypothetical video camera positioned behind the attentional game character is looking forward in the background of a displayed video game image, the game player can clearly see an approaching opponent game character in front of the attentional game character. However, the game player cannot see the attentional game character and its surrounding areas in an objective fashion because of the limited area displayed in front of the attentional game character. When an opponent game character comes in from a lateral side, since the area displayed in front of the moving attentional game character within the video game image is small, the game player finds it difficult to take an appropriate action easily.

SUMMARY OF THE INVENTION

It is therefore an object of the present invention to provide an apparatus for and a method of displaying a video game image in a manner to allow a game player to see a moving attentional game character and its surrounding areas objectively and also to clearly see an area in front of the moving attentional game character.

Another object of the present invention is to provide a recording medium which stores a control program for displaying a video game image in a manner to allow a game player to see a moving attentional game character and its surrounding areas objectively and also to clearly see an area in front of the moving attentional game character.

According to an aspect of the present invention, there is provided an apparatus for displaying a video image to move a perspective of the image in a direction in which an attentional subject moves for displaying the attentional subject in an attentional area in the video image, the apparatus including image display means for displaying the attentional subject in the attentional area in the video image, and control means for moving the perspective of the video image in the direction in which the attentional subject moves in the video image, and moving the perspective of the video image and the attentional area so that the attentional subject will be located in a rear position opposite to the direction in which the attentional subject moves, when the attentional subject is about to move out of the attentional area. The control means may comprises coordinate transforming means for transforming coordinates of the attentional subject in three-dimensional coordinate system into coordinates thereof in a plane field-of-view coordinate system, coordinate holding means for holding coordinates of the attentional subject transformed by the coordinate transforming means before and after the attentional subject moves, image display control means for displaying the attentional subject according to the coordinates transformed by the coordinate transforming means, together with a predetermined image, in the video image, decision means for deciding whether the attentional subject has moved out of the attentional area in the video image, calculating means for calculating a direction in which the attentional subject has moved based on the coordinates held by the coordinate holding means, if the attentional subject has moved out of the attentional area, and image perspective moving means for controlling the image display control means to move the perspective of the video image and the attentional area so that the attentional subject will be located in the rear position opposite to the direction calculated by the calculating means.

According to another aspect of the present invention, there is provided an apparatus for displaying a video image to move a perspective of the image in a direction in which an attentional subject moves for displaying the attentional subject in an attentional area in the video image, the apparatus comprising image display means for displaying the attentional subject in the attentional area in the video image, and control means for moving the perspective of the video image in the direction in which the attentional subject moves in the video image, and moving the perspective of the video image and the attentional area, when a reference point of the attentional area has reached a first position in a reference point movement range, in which the reference point is movable, at the time the attentional subject is about to move out of the attentional area, so that the attentional subject will be located in the attentional area that is moved to a second position in the reference point movement range which is in point-symmetry relation to the first position across a center of the reference point movement range. The control means may comprise coordinate transforming means for transforming coordinates of the attentional subject in a three-dimensional coordinate system into coordinates thereof in a plane field-of-view coordinate system, decision means for deciding whether the attentional subject has moved out of the attentional area in the video image, and image perspective moving means for moving the attentional subject into the attentional area which is moved, when the reference point of the attentional area has reached the first position at the time the attentional subject is about to move out of the attentional area, so that the reference point will be located in the second position which is in point-symmetry relation to the first position across the center of the reference point movement range.

According to still another aspect of the present invention, there is provided an apparatus for displaying a video image to move a perspective of the image in a direction in which an attentional subject moves for displaying the attentional subject in an attentional area in the video image, the apparatus comprising image display means for displaying the attentional subject in the attentional area in the video image, and control means for moving the perspective of the video image in the direction in which the attentional subject moves in the video image, and moving the perspective of the video image and the attentional area, when a reference point of the attentional area has reached a boundary position of a reference point movement range, in which the reference point is movable, at the time the attentional subject is about to move out of the attentional area, so that the attentional subject will be located in the attentional area that is moved with the reference point thereof located in a first one of divided radial areas of the reference point movement range other than a second one of the divided radial areas that is closest to the attentional subject. The control means may comprise coordinate transforming means for transforming coordinates of the attentional subject in a three-dimensional coordinate system into coordinates thereof in a plane field-of-view coordinate system, decision means for deciding whether the attentional subject has moved out of the attentional area in the video image, and image perspective moving means for moving the attentional subject into the attentional area which is moved, when the reference point of the attentional area has reached the boundary position at the time the attentional subject is about to move out of the attentional area, so that the reference point will be located in the attentional area that is moved with the reference point thereof located in the first one of divided radial areas of the reference point movement range other than the second one of the divided radial areas that is closest to the attentional subject.

According to yet still another aspect of the present invention, there is provided a method of displaying a video image to move a perspective of the image in a direction in which an attentional subject moves for displaying the attentional subject in an attentional area in the video image, the method comprising the steps of transforming coordinates of the attentional subject in a three-dimensional coordinate system into coordinates thereof in a plane field-of-view coordinate system, holding transformed coordinates of the attentional subject before and after the attentional subject moves, displaying the attentional subject according to the transformed coordinates, together with a predetermined image, in the video image, deciding whether the attentional subject has moved out of the attentional area in the video image, calculating a direction in which the attentional subject has moved based on the coordinates which are held, if the attentional subject has moved out of the attentional area, and moving the perspective of the video image and the attentional area so that the attentional subject will be located in a rear position opposite to the calculated direction.

According to a further aspect of the present invention, there is provided a method of displaying a video image to move a perspective of the image in a direction in which an attentional subject moves for displaying the attentional subject in an attentional area in the video image, the method comprising the steps of transforming coordinates of the attentional subject in a three-dimensional coordinate system into coordinates thereof in a plane field-of-view coordinate system, deciding whether the attentional subject has moved out of the attentional area in the video image, and moving the perspective of the video image in the direction in which the attentional subject moves in the video image, and moving the perspective of the video image and the attentional area, when a reference point of the attentional area has reached a first position in a reference point movement range, in which the reference point is movable, at the time the attentional subject is about to move out of the attentional area, so that the attentional subject will be located in the attentional area that is moved to a second position in the reference point movement range which is in point-symmetry relation to the first position across a center of the reference point movement range.

According to a still further aspect of the present invention, there is provided a method of displaying a video image to move a perspective of the image in a direction in which an attentional subject moves for displaying the attentional subject in an attentional area in the video image, the method comprising the steps of transforming coordinates of the attentional subject in a three-dimensional coordinate system into coordinates thereof in a plane field-of-view coordinate system, deciding whether the attentional subject has moved out of the attentional area in the video image, and moving the attentional subject into the attentional area which is moved, when a reference point of the attentional area has reached a boundary position of a reference point movement range, in which the reference point is movable, at the time the attentional subject is about to move out of the attentional area, so that the attentional subject will be located in the attentional area that is moved with the reference point thereof located in a first one of divided radial areas of the reference point movement range other than a second one of the divided radial areas that is closest to the attentional subject.

According to another aspect of the present invention, there is provided a recording medium which stores a control program for displaying a video image to move a perspective of the image in a direction in which an attentional subject moves for displaying the attentional subject in an attentional area in the video image, the control program comprising the steps of transforming coordinates of the attentional subject in a three-dimensional coordinate system into coordinates thereof in a plane field-of-view coordinate system, holding transformed coordinates of the attentional subject before and after the attentional subject moves, displaying the attentional subject according to the transformed coordinates, together with a predetermined image, in the video image, deciding whether the attentional subject has moved out of the attentional area in the video image, calculating a direction in which the attentional subject has moved based on the coordinates which are held, if the attentional subject has moved out of the attentional area, and moving the perspective of the video image and the attentional area so that the attentional subject will be located in a rear position opposite to the calculated direction.

According to still another aspect of the present invention, there is provided a recording medium which stores a control program for displaying a video image to move a perspective of the image in a direction in which an attentional subject moves for displaying the attentional subject in an attentional area in the video image, the control program comprising the steps of transforming coordinates of the attentional subject in a three-dimensional coordinate system into coordinates thereof in a plane field-of view coordinate system, deciding whether the attentional subject has moved out of the attentional area in the video image, and moving the perspective of the video image in the direction in which the attentional subject moves in the video image, and moving the perspective of the video image and the attentional area, when a reference point of the attentional area has reached a first position in a reference point movement range, in which the reference point is movable, at the time the attentional subject is about to move out of the attentional area, so that the attentional subject will be located in the attentional area that is moved to a second position in the reference point movement range which is in point-symmetry relation to the first position across a center of the reference point movement range.

According to yet still another aspect of the present invention, there is provided a recording medium which stores a control program for displaying a video image to move a perspective of the image in a direction in which an attentional subject moves for displaying the attentional subject in an attentional area in the video image, the control program comprising the steps of transforming coordinates of the attentional subject in a three-dimensional coordinate system into coordinates thereof in a plane field-of-view coordinate system, deciding whether the attentional subject has moved out of the attentional area in the video image, and moving the attentional subject into the attentional area which is moved, when a reference point of the attentional area has reached a boundary position of a reference point movement range, in which the reference point is movable, at the time the attentional subject is about to move out of the attentional area, so that the attentional subject will be located in the attentional area that is moved with the reference point thereof located in a first one of divided radial areas of the reference point movement range other than a second one of the divided radial areas that is closest to the attentional subject.

With the above arrangement, when the attentional subject is about to move out of the attentional area, the perspective of the video image is moved to bring the attentional subject to a position in a direction opposite to the direction in which the attentional subject moves. Therefore, a wide area is provided in front of the attentional subject in the direction in which it moves. The attentional subject and its surrounding areas that are displayed in the video image can thus be seen in an objective fashion. Since the wide area is provided in front of the attentional subject in the direction in which it moves, it provides enough room for maneuver to take an action easily even when another subject suddenly pops up in the displayed video image.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a view of a video game image displayed on a television monitor of the video game apparatus;

DETAILED DESCRIPTION OF THE PREFERRED EMBODIMENTS

Figure 1:
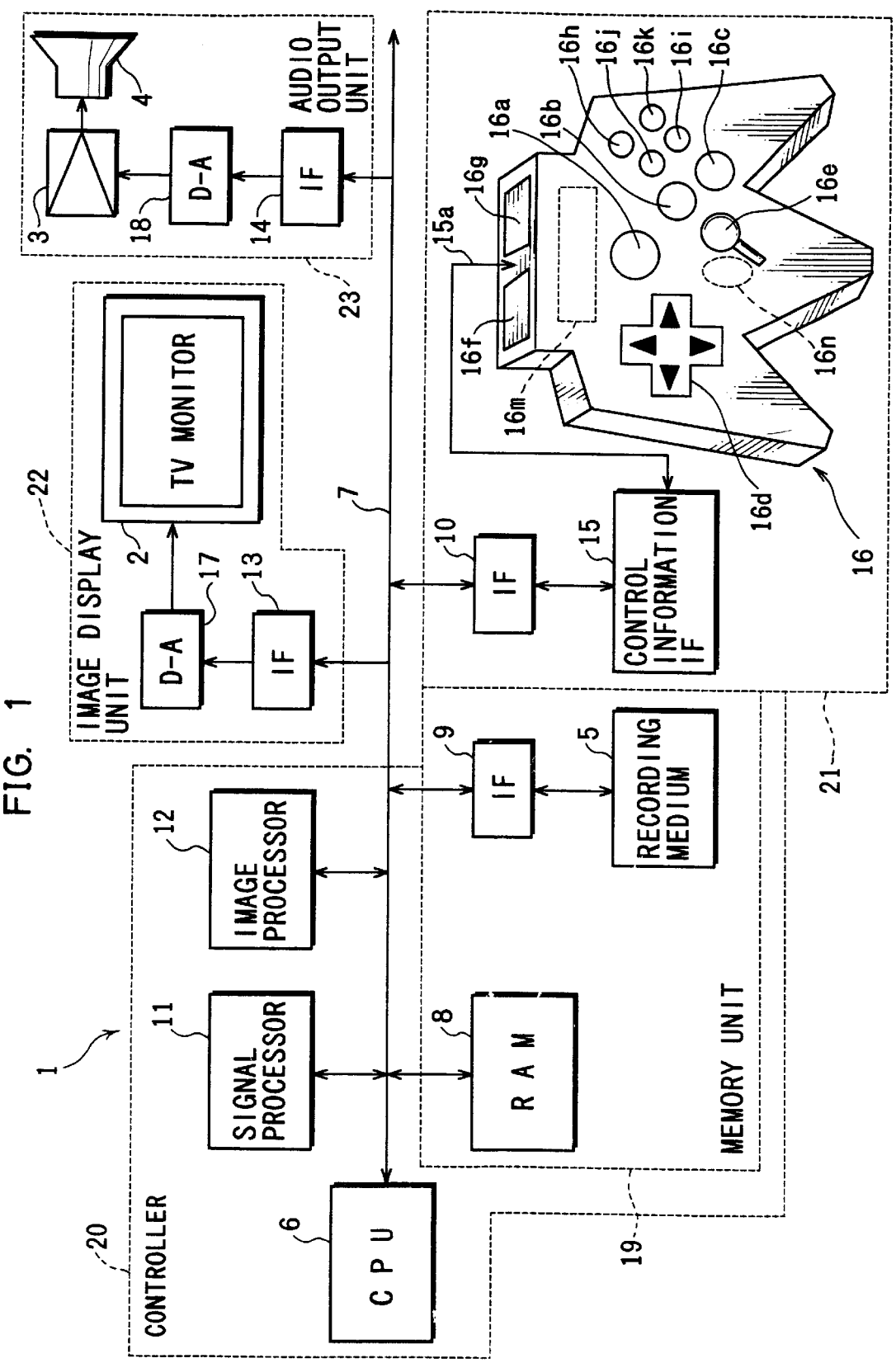
FIG. 1 is a block diagram of a video game apparatus according to an embodiment of the present invention.

FIG. 1 shows in block form a video game apparatus 1 according to the present invention. As shown in FIG. 1, the video game apparatus 1 generally comprises a game machine (not shown), a television monitor 2 for displaying video game images on a display screen thereof, an integrated amplifier 3, a speaker 4, and a recording medium 5 which stores game data including image data, audio data, and program data which includes an operating system. The recording medium 5 comprises a ROM cassette, which is a ROM housed in a plastic case, an optical disk, or a flexible disk which stores the game data.

The video game apparatus 1 also comprises a CPU 6, a bus 7 connected to the CPU 6 and comprising an address bus, a data bus, and a control bus, a RAM 8 connected to the bus 7 for storing various items of data, interfaces 9, 10 connected to the bus 7, a signal processor 11 connected to the bus 7, an image processor 12 connected to the bus 7, and interfaces 13, 14 connected to the bus 7. The recording medium 5 is connected to the interface 9. A manual controller 16 is connected through a control information interface 15 to the interface 10 for supplying control signals to the CPU 6 to enable the CPU 6 to issue various commands.

The signal processor 11 serves to calculate two-dimensional positions and generate and process audio data. The image processor 12 serves to generate and store image data to be displayed into the RAM 8 based on calculated results in the signal processor 11. The interface 13 is connected through a D/A converter 17 to the television monitor 2 for supplying image data from the RAM 8 to the television monitor 2. The interface 14 is connected through a D/A converter 18 to the integrated amplifier 3 for supplying audio data through the integrated amplifier 3 to the speaker 4.

The video game apparatus 1 may take different system configurations depending on the manner in which it is used. If the video game apparatus 1 is used as a home video game system, for example, then the television monitor 2, the integrated amplifier 3, and the speaker 4 are separate from the other parts of the game machine. If the video game apparatus 1 is used as an arcade video game system, for example, then all the parts shown in FIG. 1 are assembled as a unit and encased in a single housing. If the video game apparatus 1 is constructed around a personal computer or a work station, then the television monitor 2 corresponds to the display monitor of the computer, the image processor 12 corresponds to part of the game program data stored in the recording medium 5 or a hardware arrangement on an expansion board inserted in an expansion slot of the computer, and the interfaces 9, 10, 13, 14, the D/A converters 17, 18, and the control information interface 15 correspond to a hardware arrangement on an expansion board inserted in an expansion slot of the computer. The RAM 8 corresponds to areas of a main memory or an expansion memory of the computer. In the illustrated embodiment, the video game apparatus 1 will be described as a home video game system.

The manual controller 16 has a start button 16a, an A button 16b, a B button 16c, a cross key 16d, a control stick 16e, a left trigger button 16f, a right trigger button 16g, a C1 button 16h, a C2 button 16i, a C3 button 16j, a C4 button 16k, a connector 16m, and a depth button 16n. A memory for temporarily storing data with respect to the progress of a video game is detachably connected to the connector 16m. The controller stick 16a is movable not only in upward, downward, leftward, and rightward directions, but also universally in an angular range of 360°. The controller stick 16a basically functions as a joystick. For example, the game player can operate the controller stick 16a to turn a displayed game character 360° back to its original position, whereupon the displayed game character stops its movement.

Functional blocks of the video game apparatus 1 will be described in detail below.

The RAM 8, the interface 9, and the recording medium 5 jointly serve as a memory unit 19. The CPU 6, the signal processor 11, the image processor 12, and the memory unit 19 jointly serve as a controller 20. The CPU 6 controls the signal processor 11 to process the game data including image data, audio data, and program data stored in the recording medium 5. Based on the processed data, the CPU 6 controls the image processor 12 to generate and store image data to be displayed and audio data to be outputted in the RAM 8. The controller 20 effects a control process for moving a displayed video game image in the direction in which an attentional game character moves in the video game image, so that the attentional game character will be displayed in a given attentional area in the video game image, and also for moving the video game image and the given attentional area such that the attentional game character will be located in a rear position on an extension opposite to the direction in which the attentional game character moves, when the attentional game character has moves out of the given attentional area.

More specifically, the controller 20 functionally comprises a coordinate transforming means for transforming coordinates of an attentional subject in a three-dimensional coordinate system into coordinates thereof in a plane field-of-view coordinate system, a coordinate holding means for holding coordinates of the attentional subject transformed by the coordinate transforming means before and after the attentional subject moves, an image display control means for displaying the attentional subject according to the coordinates transformed by the coordinate transforming means, together with a predetermined image, in a video game image, decision means for deciding whether the attentional subject has moved out of a predetermined attentional area in the video game image, calculating means for calculating a direction in which the attentional subject has moved based on the coordinates held by the coordinate holding means, if the attentional subject has moved out of the predetermined attentional area, and an image perspective moving means for controlling the image display control means to move the perspective of the video game image and the predetermined attentional area so that the attentional subject will be located in a rear position on an extension opposite to the direction calculated by the calculating means.

The interface 10, the control information interface 15, and the manual controller 16 jointly make up a control input unit 21, which supplies control signals entered by the game player through the manual controller 16 to move a displayed attentional subject to the CPU 6, which issues commands to start and continue a video game.

The interface 13, the D/A converter 17, and the television monitor 2 jointly serve as an image display unit 22. Image data generated by the image processor 12 and stored in the RAM 8 is supplied through the interface 13 and the D/A converter 17 to the television monitor 2, which displays an attentional subject controlled by the game player and surrounding areas in a video game image.

The interface 14, the D/A converter 18, the integrated amplifier 3, and the speaker 3 jointly serve as an audio output unit 23. Audio data generated by the signal processor 11 and stored in the RAM 8 is supplied through the interface 14, the D/A converter 18, and the integrated amplifier 3 to the speaker 4, which radiates sound depending on the progress of a video game.

A control process carried out by the controller 20 including the CPU 6 which is controlled by the game data including image data, audio data, and program data stored in the recording medium 5 will be described in detail below.

FIG. 2 shows a video game image displayed on the television monitor 2 of the video game apparatus 1 shown in FIG. 1.

Video game images displayed on the television monitor 2 will be described as if captured by a video camera. However, such a video camera is a hypothetical video camera, and is not actually connected to the video game apparatus 1, but represents a view point from which the displayed video game images are viewed.

As shown in FIG. 2, an outer screen frame 31 is an outer marginal frame of a displayed video game image which is captured by a hypothetical video camera, and corresponds to a white marginal frame on a photoprint. Within the outer screen frame 31, there is a subject movement range frame 32 within which an attentional subject 33 can move. The attentional subject 33 represents, for example, a human being such as a character to be focused by the video camera or an object such as a symbol. In video games, the attentional subject 33 corresponds to a game character which is controlled by the controller 20 according to control signals that are entered through the manual controller 16 by a game player who plays with the video game apparatus 1. A hypothetical rectangular focus frame 34, which is a given attentional area located within the subject movement range frame 32, is a hypothetical area for displaying the attentional subject 33 movably therein when the attentional subject 33 is focused by the video camera. The rectangular focus frame 34 has a crisscross central reference point 36 located centrally therein which is movable within a circular center movement range 37 that is located as a reference point movement range centrally within the subject movement range frame 32. Therefore, the attentional subject 33 is movable within a movement range which is the sum of the rectangular focus frame 34 and the circular center movement range 37 while a video game image displayed within the subject movement range frame 32 is being fixed. Although the focus frame 34 is shown as rectangular in shape and the center movement range 37 is shown as circular in shape, they are not limited to those shapes, but may be other shapes depending on the shape of the subject movement range frame 32. For example, if the subject movement range frame 32 is of an elongate rectangular shape, then both the focus frame 34 and the center movement range 37 may be of an elongate rectangular shape. If the subject movement range frame 32 has arcuate corners, then both the focus frame 34 and the center movement range 37 may be of a circular or elliptical shape. Therefore, the focus frame 34 and the center movement range 37 may be of any of rectangular shapes including square and elongate rectangular shapes, a circular shape, an elliptical shape, etc.

When the attentional subject 33 moves within the focus frame 34, the focus frame 34 and the perspective of the entire displayed video game image are not moved. When the attentional subject 33 is about to move out of the focus frame 34, i.e., when the attentional subject 33 moves across a boundary line of the focus frame 34, the perspective of the entire displayed video game image is moved in the direction in which the attentional subject 33 moves, in order that the attentional subject 33 will remain positioned in the focus frame 34. At this time, the focus frame 34 moves in the video game image in the opposite direction to the direction in which the attentional subject 33 moves, to the extent that the crisscross central reference point 36 of the focus frame 34 will be kept within the circular center movement range 37.

Figure 3A:
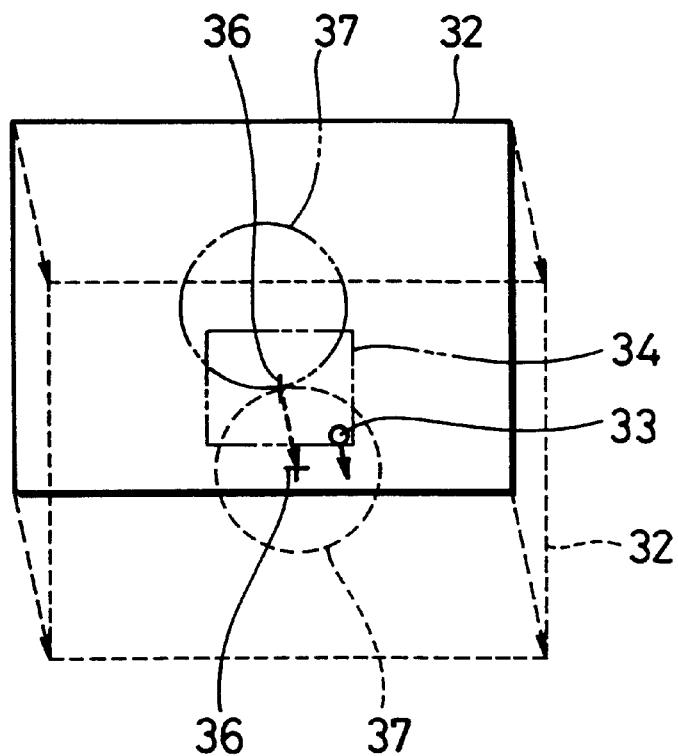
FIGS. 3A and 3B are views of video game images, showing the manner in which a focus frame and an attentional game character are moved back in an opposite direction to the direction in which the attentional game character moves.

More specifically, when the attentional subject 33 is about to move out of the focus frame 34, the perspective of the entire video game image displayed in the subject movement range frame 32 is moved in the direction in which the attentional subject 33 moves, as indicated by a transition from the solid-line frame 32 to the dotted-line frame 32 in FIG. 3A, so that the attentional subject 33 will remain positioned within the focus frame 34. At this time, the perspective of the entire displayed video game image is moved such that the focus frame 34 is moved to a certain position in the opposite direction to the direction, indicated by the arrow A in FIG. 3B, in which the attentional subject 33 moves, and the attentional subject 33 is kept within the focus frame 34. The certain position, referred to above, to which the focus frame 34 is moved is a rear position on an extension opposite to the direction indicated by the arrow A in which the attentional subject 33 is about to move out of the focus frame 34. The rear position, referred above, is a position in which the crisscross central reference point 36 of the focus frame 34 is located on a circular boundary line of the circular center movement range 37 when the crisscross central reference point 36 is moved opposite and parallel to the direction indicated by the arrow A. The direction indicated by the arrow A can be determined by calculating the direction in which the attentional subject 33 is about to move out of the focus frame 34 can be calculated, based on the coordinates, held by the coordinate holding means, of the attentional subject 33 before and after the attentional subject 33 moves if the decision means determines that the attentional subject 33 moves out of the focus frame 34.

Figure 4A:
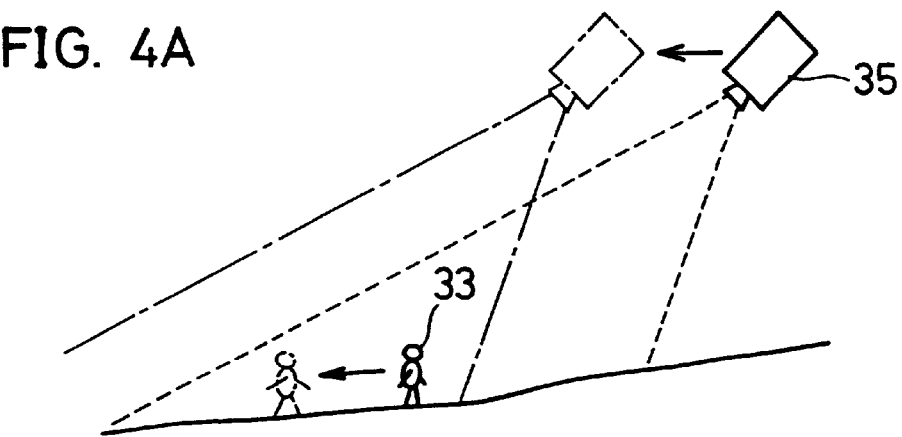
FIG. 4A is a view showing the manner in which a hypothetical video camera for capturing an attentional game character is linearly moved horizontally along an axis of movement of the attentional game character.
Figure 4B:
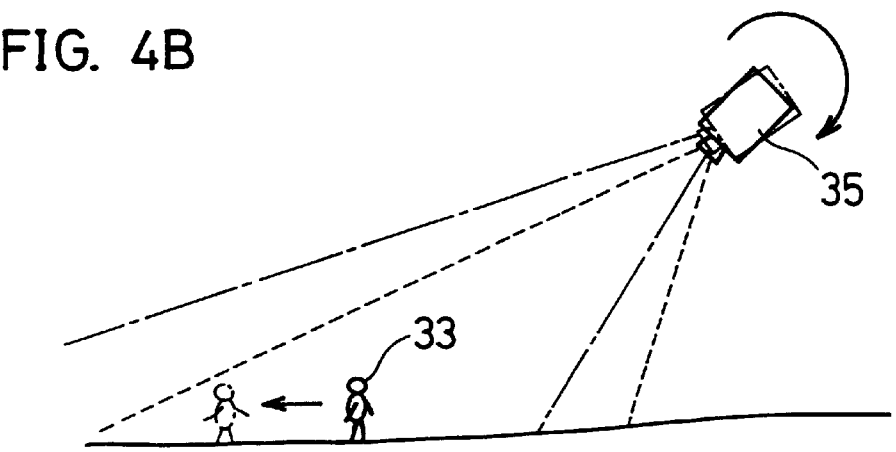
FIG. 4B is a view showing the manner in which a hypothetical video camera for capturing an attentional game character is tilted along a horizontal axis as the attentional game character moves.
Figure 4C:
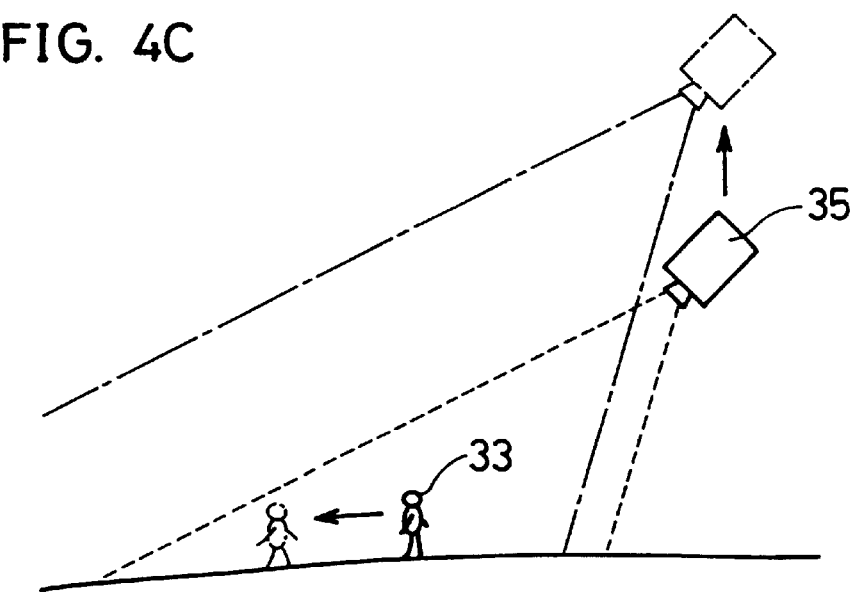
FIG. 4C is a view showing the manner in which a hypothetical video camera for capturing an attentional game character is linearly moved vertically as the attentional game character moves.

The perspective of the entire video game image displayed in the subject movement range frame 32 is moved in any of various fashions as described below. If a hypothetical video camera 35 (see FIGS. 4A–4C) which captures the attentional subject 33 is freely movable horizontally as shown in FIG. 4A, then the camera 35 may be moved horizontally in the direction in which the attentional subject 33 moves. If the video camera 35 is fixed but tiltable about a horizontal axis as shown in FIG. 4B, then the video camera 35 may be tilted to shift its viewpoint from a foreground area to a background area as the attentional subject 33 moves, so that the displayed area in front of the moving attentional subject 33 will remain wide. If the video camera 35 is freely movable vertically as shown in FIG. 4C, then the video camera 35 may be moved upwardly to increase its field-of-view (or downwardly to reduce its field-of-view).

Alternatively, the video camera 35 may first be tilted as shown in FIG. 4B and then moved horizontally as shown in FIG. 4A. Further alternatively, the video camera 35 may first be moved upwardly as shown in FIG. 4C and then moved horizontally as shown in FIG. 4A.

As described above, the attentional subject 33 is retained in the video game image by establishing the hypothetical focus frame 34 as a given attentional area and displaying the attentional subject 33 within the focus frame 34. Insofar as the attentional subject 33 moves within the focus frame 34, the hypothetical video camera 35 which captures the attentional subject 33 remains fixed and is not moved. When the attentional subject 33 is about to move out of the focus frame 34, the perspective of the displayed video game image is moved in the direction to keep the moving attentional subject 33 within the focus frame 34, such that the hypothetical video camera 35 moves as the attentional subject 33 moves. In order to provide a wide area in front of the moving attentional subject 33, the perspective of the displayed video game image and the focus frame 34 are moved to move the attentional subject 33 to the rear position on the extension opposite to the direction in which the attentional subject 33 moves.

Figure 5:
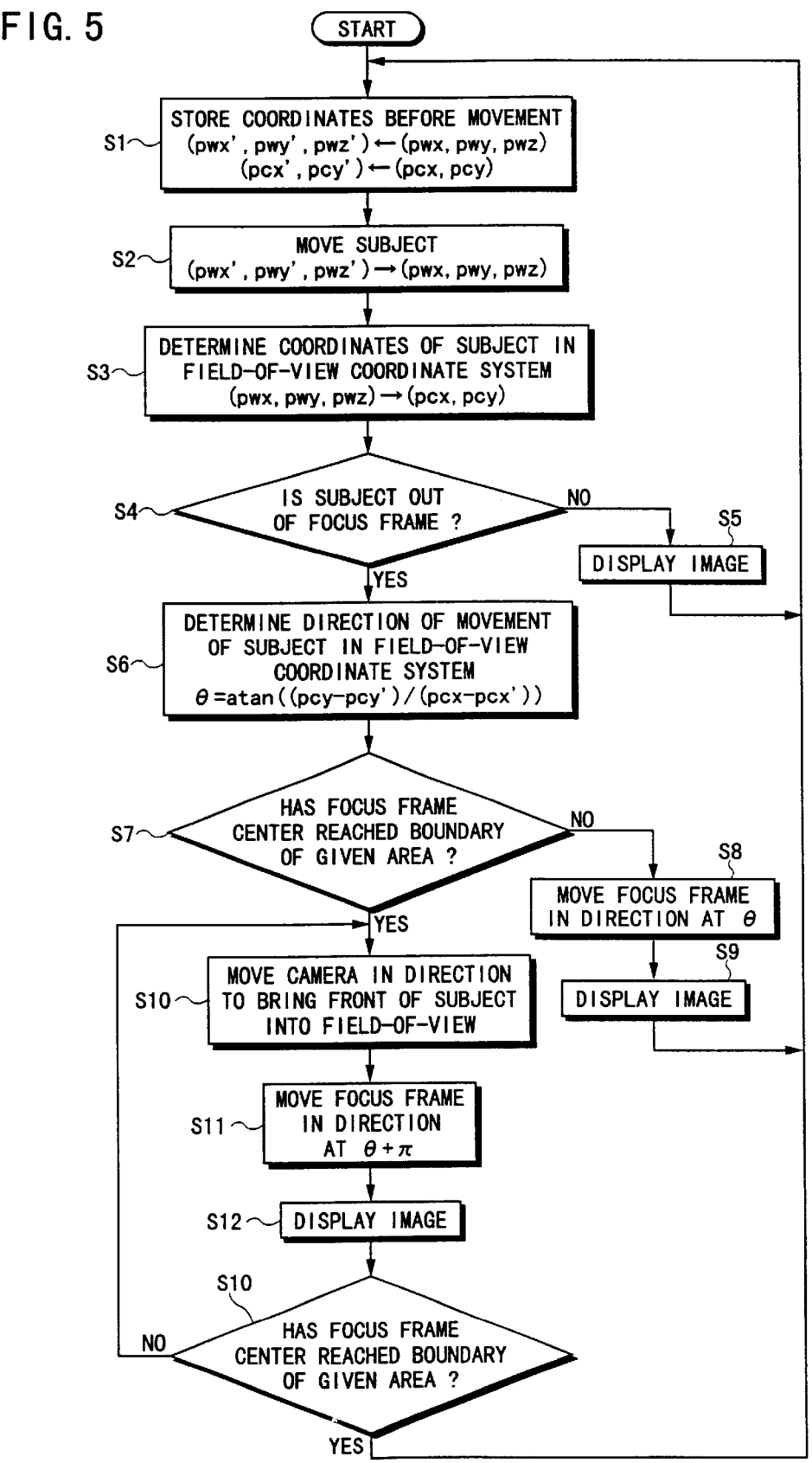
FIG. 5 is a flowchart of an operation sequence of the video game apparatus shown in FIG. 1.

Operation of the video game apparatus 1 shown in FIG. 1 will be described below with reference to FIGS. 5 and 6.

Figure 6:
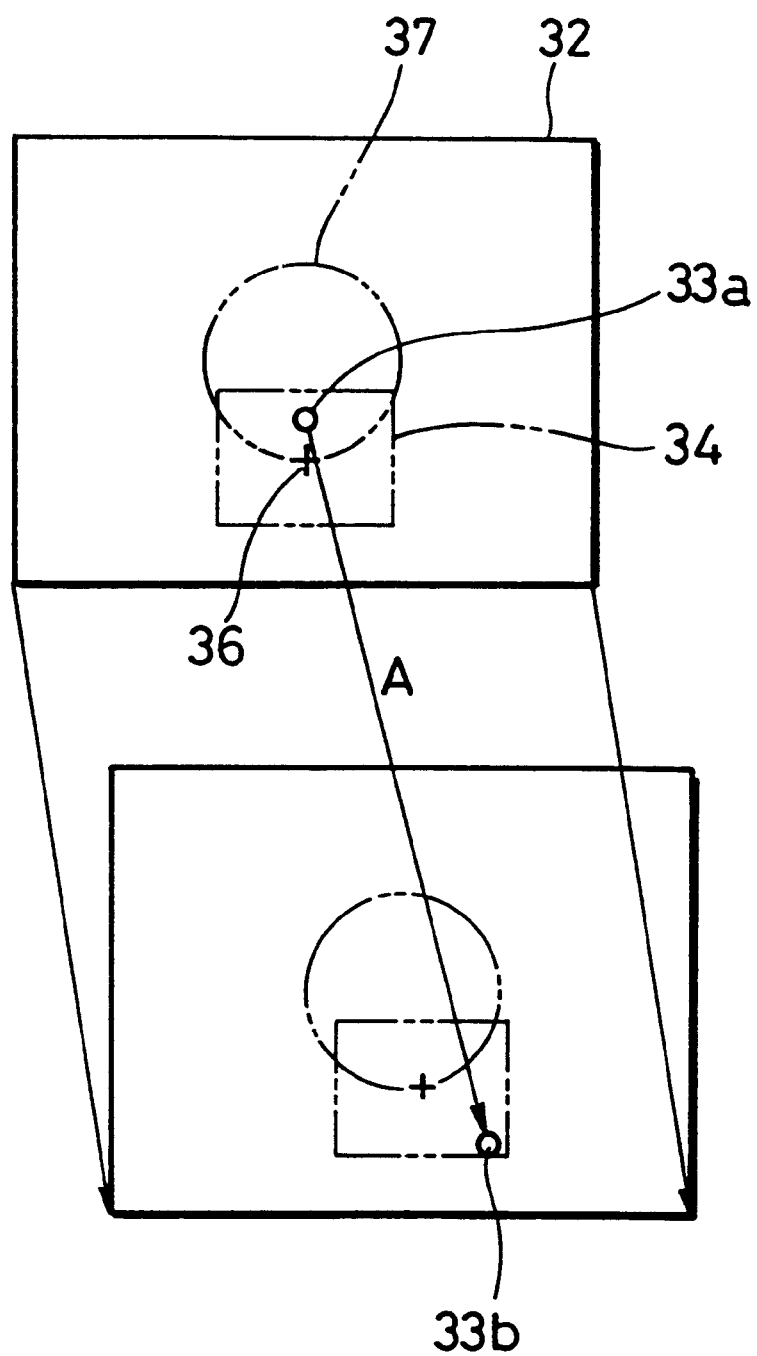
FIG. 6 is a view showing the manner in which a focus frame and an attentional game character move in a video game image.

As shown in FIG. 6, when an attentional subject 33a displayed in a video game image displayed on the television monitor 2 moves in the focus frame 34 and reaches a boundary line of the focus frame 34, the controller 20 is controlled by a control program included in the program data to store, in the RAM 8, two-dimensional coordinates (pcx', pcy') of the attentional subject 33 in the video game image and three-dimensional coordinates (pwx', pwy', pwz') of the attentional subject 33 in a three-dimensional space before the attentional subject 33 moves, in a step S1. Positional coordinates (pwx, pwy, pwz) of the attentional subject 33 change as the attentional subject 33 moves in the three-dimensional space in a step S2. In a next step S3, the controller 20 converts the three-dimensional coordinates (pwx, pwy, pwz) of the attentional subject 33 into two-dimensional coordinates (pcx, pcy) thereof in the video game image, thereby determining coordinates in a plane field-of-view coordinate system of the attentional subject 33.

Then, the controller 20 decides in a step S4 whether or not the coordinates of the attentional subject 33 are located outside of the coordinate area of the focus frame 34 in the displayed video game image for thereby deciding whether the attentional subject 33 has essentially moved out of the focus frame 34. If the attentional subject 33 has not essentially moved out of the focus frame 34 ("NO" in the step S4), then the controller 20 displays the attentional subject 33 and a background image in the video game image displayed on the television monitor 2 at the time in a step S5. There after, control goes back to the step S1 to store next coordinates of the attentional subject 33 before it moves.

If the attentional subject 33 has essentially moved out of the focus frame 34 ("YES" in the step S4), then the controller 20 determines an angle θ of the direction, indicated by the arrow A, in which the attentional subject 33 moves in the plane field-of-view coordinate system in a step S6. Specifically, the controller 20 calculates the angle θ of the direction, indicated by the arrow A, based on the two-dimensional coordinates (pcx', pcy') of the attentional subject 33 stored in the RAM 8 and the two-dimensional coordinates (pcx, pcy) of the attentional subject 33 when it has moved out of the focus frame 34. Thereafter, the controller 20 decides in a step S7 whether or not the central reference point 36 of the focus frame 34 has reached a boundary position of the center movement range 37. If the central reference point 36 has not reached a boundary position of the center movement range 37 ("NO"in the step S7), then the controller 20 moves the focus frame 34 in the direction indicated by the arrow A, i.e., at the calculated angle θ to bring the attentional subject 33 into the focus frame 34. Specifically, in order to bring the attentional subject 33 into the focus frame 34, the focus frame 34 is moved in the direction in which the attentional subject 33 moves, at a speed greater than the speed at which the attentional subject 33 moves. In a next step S9, the controller 20 controls the image processor 12 to display the attentional subject 33 so as to be positioned in the focus frame 34. Thereafter, control goes back to the step S1 to store next coordinates of the attentional subject 33 before it moves.

If the central reference point 36 of the focus frame 34 has reached a boundary position of the center movement range 37 in the step S7, then the controller 20 moves the video camera 35 in the direction, indicated by the arrow A, at the angle θ to bring the area in front of the attentional subject 33 into the field-of-view provided by the displayed video game image in a step S10. Thereafter, in a step S11, the controller 20 moves the focus frame 34 to locate the attentional subject 33 in a rear position on an extension opposite to the direction, indicated by the arrow A, in which the attentional subject 33 moves, and moves the video camera 35 to bring the attentional subject 33 into the moved focus frame 34 for thereby returning the attentional subject 33 to the rear position opposite to the direction indicated by the arrow A. In a step S12, the controller 20 displays on the television monitor 2 a video game image in which a wide empty area is provided in front of the attentional subject 33 in the direction in which it moves and the attentional subject 33 is positioned in the focus frame 34.

The attentional subject 33 is moved back in the opposite direction to the direction indicated by the arrow A in the displayed video game image at a speed which is selected depending on the speed at which the attentional subject 33 moves. The direction in which the attentional subject 33 is moved back is a linear direction opposite to the direction indicated by the arrow A.

Then, the controller 20 decides in a step S13 whether or not the central reference point 36 of the focus frame 34 has reached a boundary position of the center movement range 37. The steps S10, S11, S12 are repeated until the central reference point 36 of the focus frame 34 has reached a boundary position of the center movement range 37. If the central reference point 36 of the focus frame 34 has reached a boundary position of the center movement range 37, then control goes back to the step S1 to store next coordinates of the attentional subject 33 before it moves.

Figure 3B:
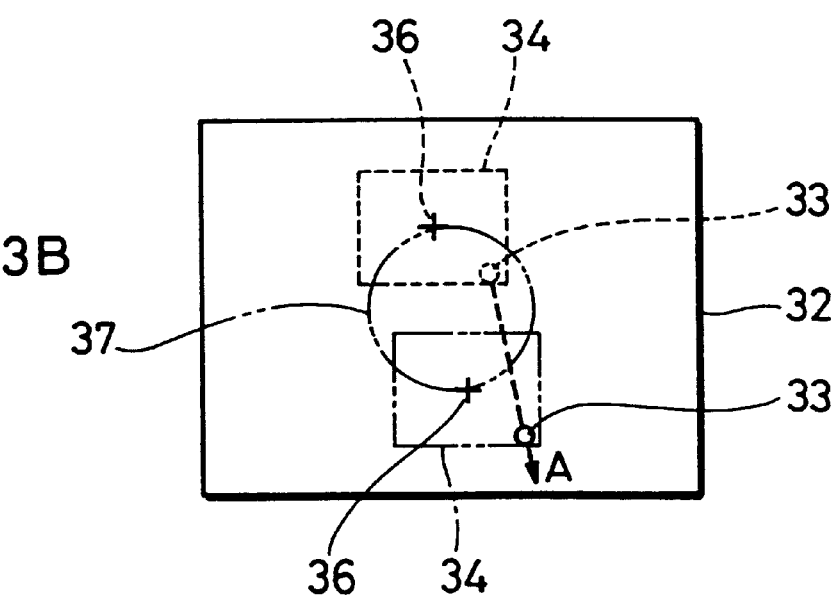

At this time, the focus frame 34 and the attentional subject 33 are positioned as shown by the dotted lines in FIG. 3B. As shown in FIG. 3B, a wide empty area is present in front of the attentional subject 33 in the direction in which it moves. Thereafter, in the video game image displayed on the television monitor 2, the attentional subject 33 moves with the focus frame 34 in the direction indicated by the arrow A until the attentional subject 33 reaches a boundary line of the focus frame 34 as shown in FIG. 6. When the attentional subject 33 reaches a boundary line of the focus frame 34, control returns to the step S1 and repeats the steps S1–S13 for thereby repeating the above process in which the attentional subject 33 moves to a limit of the range in which it is movable and thereafter is moved back to provide a wide empty area in front of the attentional subject 33 in the direction in which it moves.

As described above, when the attentional subject 33 is about to move out of the focus frame 34, the perspective of the displayed video game image and the focus frame 34 are moved in order to locate the attentional subject 33 in a rear position on an extension opposite to the direction in which the attentional subject 33 moves, and the attentional subject 33 is moved back in the displayed image in the opposite direction to the direction indicated by the arrow A to bring the attentional subject 33 into the moved focus frame 34. Consequently, a certain wide area is provided in front of the attentional subject 33 in the direction in which it moves, and also around the attentional subject 33. The game player who is viewing the video game image is now allowed to objectively see the attentional subject 33 and its surrounding areas. Since the wide area is provided in front of the attentional subject 33 in the direction in which it moves, it provides enough room for maneuver for the game player to take an action easily even when an opponent game character suddenly pops up in the displayed video game image.

In the above embodiment, not only the perspective of the displayed video game image is moved in order to bring the attentional subject 33 into the focus frame 34, but also the focus frame 34 is moved back to a rear position on an extension opposite to the direction indicated by the arrow A in which the attentional subject 33 moves, for providing a wide area in front of the attentional subject 33 in the direction in which it moves, and the attentional subject 33 is brought into the moved focus frame 34. The rear position, referred above, is a position in which the crisscross central reference point 36 of the focus frame 34 is located on a circular boundary line of the circular center movement range 37 when the crisscross central reference point 36 is moved opposite and parallel to the direction indicated by the arrow A.

According to another embodiment of the present invention, the controller 20 moves the perspective of the displayed video game image in the direction in which the attentional subject 33 moves in order to bring the attentional subject 33 into the focus frame 34. Furthermore, when the central reference point 36 of the focus frame 34 has reached a boundary position of the center movement range 37 at the time the attentional subject 33 is about to move out of the focus frame 34, the controller 20 moves the attentional subject 33 into the focus frame 34 which is moved so that the central reference point 36 of the focus frame 34 will be located in a boundary position of the center movement range 37 which is in point-symmetry relation to the former boundary position of the center movement range 37 across the center of the center movement range 37.

Figure 7:
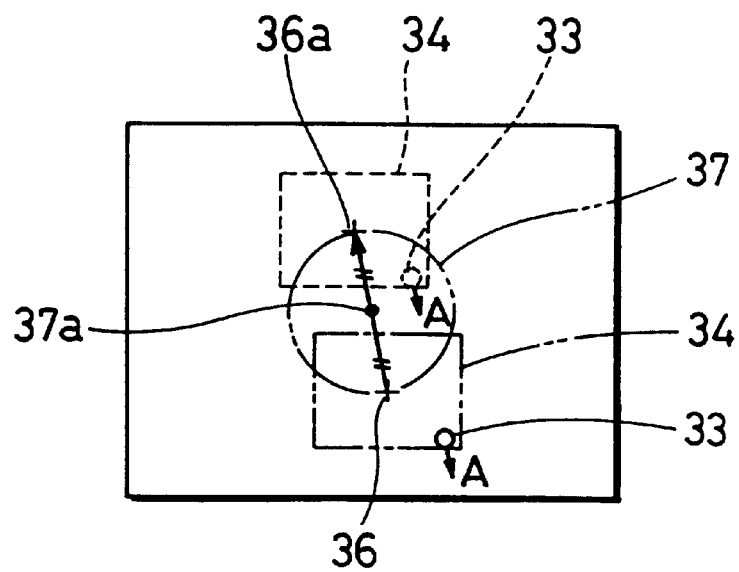
FIG. 7 is a view showing the manner in which a focus frame and an attentional game character are moved back in an opposite direction to the direction in which the attentional game character moves, in a video game apparatus according to another embodiment of the present invention.

More specifically, as shown in FIG. 7, the focus frame 34 is moved back to a position in the opposite direction to the direction, indicated by the arrow A, in which the attentional subject 33 moves, and the attentional subject 33 is kept within the focus frame 34, as indicated by the dotted lines. Furthermore, when the central reference point 36 of the focus frame 34 has reached a boundary position of the center movement range 37 at the time the attentional subject 33 is about to move out of the focus frame 34, the focus frame 34 is moved back so that the central reference point 36 of the focus frame 34 will be located in a boundary position 36a of the center movement range 37 which is in point-symmetry relation to the former boundary position of the center movement range 37 across the center 37a of the center movement range 37. At this time, the attentional subject 33 is also moved back in a direction parallel to the direction in which the central reference point 36 of the focus frame 34 is moved to the boundary position 36a of the center movement range 37 which is in point-symmetry relation to the former boundary position of the center movement range 37 across the center 37a of the center movement range 37.

In the embodiment shown in FIG. 7, the controller 20 functionally comprises a coordinate transforming means for transforming coordinates of the attentional subject 33 in a three-dimensional coordinate system into coordinates thereof in a plane field-of-view coordinate system, an image display control means for displaying the attentional subject 33 according to the coordinates transformed by the coordinate transforming means, together with a predetermined image, in a video game image, decision means for deciding whether the attentional subject 33 has moved out of the focus frame 34 in the video game image, and image perspective moving means for controlling the image display control means to move the attentional subject 33 into the focus frame 34 which is moved, when the central reference point 36 of the focus frame 34 has reached a boundary position of the center movement range 37 at the time the attentional subject 33 is about to move out of the focus frame 34, so that the central reference point 36 of the focus frame 34 will be located in the boundary position 36a of the center movement range 37 which is in point-symmetry relation to the former boundary position of the center movement range 37 across the center 37a of the center movement range 37. The above function to move the focus frame 34 may be performed in the step S11 shown in FIG. 5. Otherwise, the video game apparatus according to the embodiment shown in FIG. 7 operates according to the operation sequence shown in FIG. 5.

Figure 8:
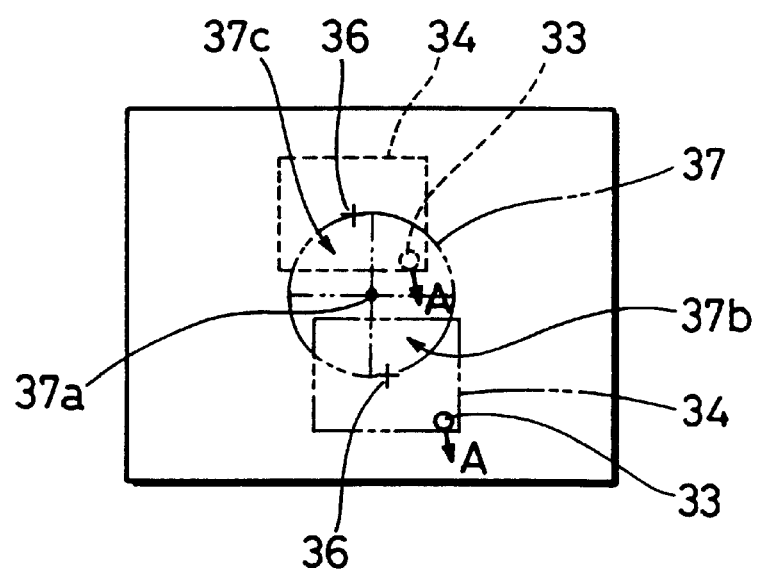
FIG. 8 is a view showing the manner in which a focus frame and an attentional game character are moved back in an opposite direction to the direction in which the attentional game character moves, in a video game apparatus according to still another embodiment of the present invention.

According to still another embodiment of the present invention, the controller 20 moves the perspective of the displayed video game image in the direction in which the attentional subject 33 in order that the attentional subject 33 is displayed in the focus frame 34. As shown in FIG. 8, moreover, the circular center movement range 37 in which the crisscross central reference point 36 of the rectangular focus frame 34 is movable is divided into four equal radial areas extending radially outwardly from the center 37a of the circular center movement range 37. When central reference point 36 of the focus frame 34 has reached a boundary position of the center movement range 37 at the time the attentional subject 33 is about to move out of the focus frame 34, the focus frame 34 is moved back so that the central reference point 36 of the focus frame 34 will be located on a boundary line of one of the radial areas, other than a radial area 37b that is closest to the attentional subject 33, e.g., on a boundary line of a radial area 37c that is diametrically opposite to the radial area 37b, and the attentional subject 33 is brought into the focus frame 34 thus moved. The circular center movement range 37 may be divided into a plurality of radial areas such as six equal radial areas, rather than the four equal radial areas as illustrated.

In the embodiment shown in FIG. 8, the controller 20 functionally comprises a coordinate transforming means for transforming coordinates of the attentional subject 33 in a three-dimensional coordinate system into coordinates thereof in a plane field-of-view coordinate system, an image display control means for displaying the attentional subject 33 according to the coordinates transformed by the coordinate transforming means, together with a predetermined image, in a video game image, decision means for deciding whether the attentional subject 33 has moved out of the focus frame 34 in the video game image, and image perspective moving means for controlling the image display control means to move the attentional subject 33 into the focus frame 34 which is moved, when the central reference point 36 of the focus frame 34 has reached a boundary position of the center movement range 37 at the time the attentional subject 33 is about to move out of the focus frame 34, so that the central reference point 36 of the focus frame 34 will be located in one of divided areas of the center movement range 37 other than the divided area closest to the attentional subject 33. The above function to move the focus frame 34 may be performed in the step S11 shown in FIG. 5. Otherwise, the video game apparatus according to the embodiment shown in FIG. 8 operates according to the operation sequence shown in FIG. 5.

The reference point 36 of the focus frame 34 has been described as being located at the center of the focus frame 34. However, the reference point 36 of the focus frame 34 may be located at an off-center position of the focus frame 34. If the focus frame 34 is of a rectangular shape, then the reference point 36 may be located at a coordinate point on a corner of the focus frame 34.

Although certain preferred embodiments of the present invention have been shown and described in detail, it should be understood that various changes and modifications may be made therein without departing from the scope of the appended claims.

What is claimed is:

1. An apparatus for displaying a video image, comprising:
   image display means for displaying an attentional subject in an attentional area in the video image;
   control means for moving the perspective of the video image in the direction in which the attentional subject moves in the video image, and moving the perspective of the video image and the attentional area so that said attentional subject will be located in a rear position opposite to said direction in which the attentional subject moves when said attentional subject is about to move out of said attentional area;
   coordinate transforming means for transforming coordinates of the attentional subject in a three-dimensional coordinate system into coordinates thereof in a plane field-of-view coordinate system;
   coordinate holding means for holding coordinates of the attentional subject transformed by said coordinate transforming means before and after the attentional subject moves;
   image display control means for displaying the attentional subject according to the coordinates transformed by said coordinate transforming means, together with a predetermined image, in the video image;
   decision means for deciding whether the attentional subject has moved out of said attentional area in the video image; and
   calculating means for calculating a direction in which the attentional subject has moved based on the coordinates held by said coordinate holding means, if the attentional subject has moved out of said attentional area; and image perspective moving means for controlling said image display control means to move the perspective of the video image and the attentional area so that the attentional subject will be located in the rear position opposite to the direction calculated by said calculating means.

2. An apparatus for displaying a video image to move a perspective of the image in a direction in which an attentional subject moves for displaying the attentional subject in an attentional area in the video image, comprising:

image display means for displaying the attentional subject in the attentional area in the video image; and control means for moving the perspective of the video image in the direction in which the attentional subject moves in the video image, and moving the perspective of the video image and the attentional area, when a reference point of said attentional area has reached a first position in a reference point movement range, in which said reference point is movable, at the time said attentional subject is about to move out of said attentional area, so that said attentional subject will be located in the attentional area that is moved to a second position in the reference point movement range which is in point-symmetry relation to said first position across a center of said reference point movement range.

3. An apparatus according to claim 2, wherein said control means comprises:

coordinate transforming means for transforming coordinates of the attentional subject in a three-dimensional coordinate system into coordinates thereof in a plane field-of-view coordinate system;

decision means for deciding whether the attentional subject has moved out of said attentional area in the video image; and image perspective moving means for moving said attentional subject into said attentional area which is moved, when said reference point of the attentional area has reached said first position at the time the attentional subject is about to move out of said attentional area, so that said reference point will be located in said second position which is in point-symmetry relation to said first position across the center of the reference point movement range.

4. An apparatus for displaying a video image to move a perspective of the image in a direction in which an attentional subject moves for displaying the attentional subject in an attentional area in the video image, comprising:

image display means for displaying the attentional subject in the attentional area in the video image; and control means for moving the perspective of the video image in the direction in which the attentional subject moves in the video image, and moving the perspective of the video image and the attentional area, when a reference point of said attentional area has reached a boundary position of a reference point movement range, in which said reference point is movable, at the time said attentional subject is about to move out of said attentional area, so that said attentional subject will be located in the attentional area that is moved with the reference point thereof located in a first one of divided radial areas of the reference point movement range other than a second one of the divided radial areas that is closest to said attentional subject.

5. An apparatus according to claim 4, wherein said control means comprises:

coordinate transforming means for transforming coordinates of the attentional subject in a three-dimensional coordinate system into coordinates thereof in a plane field-of-view coordinate system;

decision means for deciding whether the attentional subject has moved out of said attentional area in the video image; and image perspective moving means for moving said attentional subject into said attentional area which is moved, when said reference point of the attentional area has reached said boundary position at the time the attentional subject is about to move out of said attentional area, so that said reference point will be located in the attentional area that is moved with the reference point thereof located in said first one of divided radial areas of the reference point movement range other than said second one of the divided radial areas that is closest to said attentional subject.

6. A method of displaying a video image comprising:

transforming coordinates of an attentional subject in a three-dimensional coordinate system into coordinates thereof in a plane field-of-view coordinate system;

holding transformed coordinates of the attentional subject before and after the attentional subject moves;

displaying the attentional subject according to the transformed coordinates, together with a predetermined image, in the video image;

deciding whether the attentional subject has moved out of said attentional area in the video image;

calculating a direction in which the attentional subject has moved based on the coordinates which are held if the attentional subject has moved out of said attentional area; and moving the perspective of the video image and the attentional area so that the attentional subject will be located in a rear position opposite to the calculated direction, wherein a perspective of the image is moved in a direction in which the attentional subject moves for displaying the attentional subject in the attentional area in the video image.

7. A method of displaying a video image to move a perspective of the image in a direction in which an attentional subject moves for displaying the attentional subject in an attentional area in the video image, comprising the steps of:

transforming coordinates of the attentional subject in a three-dimensional coordinate system into coordinates thereof in a plane field-of view coordinate system;

deciding whether the attentional subject has moved out of said attentional area in the video image; and moving the perspective of the video image in the direction in which the attentional subject moves in the video image, and moving the perspective of the video image and the attentional area, when a reference point of said attentional area has reached a first position in a reference point movement range, in which said reference point is movable, at the time said attentional subject is about to move out of said attentional area, so that said attentional subject will be located in the attentional area that is moved to a second position in the reference point movement range which is in point-symmetry relation to said first position across a center of said reference point movement range.

8. A method of displaying a video image to move a perspective of the image in a direction in which an attentional subject moves for displaying the attentional subject in an attentional area in the video image, comprising the steps of:

transforming coordinates of the attentional subject in a three-dimensional coordinate system into coordinates thereof in a plane field-of-view coordinate system;

deciding whether the attentional subject has moved out of said attentional area in the video image; and moving said attentional subject into said attentional area which is moved, when a reference point of said attentional area has reached a boundary position of a reference point movement range, in which said reference point is movable, at the time said attentional subject is about to move out of said attentional area, so that said attentional subject will be located in the attentional area that is moved with the reference point thereof located in a first one of divided radial areas of the reference point movement range other than a second one of the divided radial areas that is closest to said attentional subject.

9. A recording medium which stores a control program for displaying a video image comprising:

transforming coordinates of the attentional subject in a three-dimensional coordinate system into coordinates thereof in a plane field-of-view coordinate system;

holding transformed coordinates of the attentional subject before and after the attentional subject moves;

displaying the attentional subject according to the transformed coordinates, together with a predetermined image, in the video image;

deciding whether the attentional subject has moved out of said attentional area in the video image;

calculating a direction in which the attentional subject has moved based on the coordinates which are held if the attentional subject has moved out of said attentional area; and moving the perspective of the video image and the attentional area so that the attentional subject will be located in a rear position opposite to the calculated direction, wherein a perspective of the image is moved in a direction in which the attentional subject moves for displaying the attentional subject in the attentional area in the video image.

10. A recording medium which stores a control program for displaying a video image to move a perspective of the image in a direction in which an attentional subject moves for displaying the attentional subject in an attentional area in the video image, said control program comprising the steps of:

transforming coordinates of the attentional subject in a three-dimensional coordinate system into coordinates thereof in a plane field-of-view coordinate system;

deciding whether the attentional subject has moved out of said attentional area in the video image; and moving the perspective of the video image in the direction in which the attentional subject moves in the video image, and moving the perspective of the video image and the attentional area, when a reference point of said attentional area has reached a first position in a reference point movement range, in which said reference point is movable, at the time said attentional subject is about to move out of said attentional area, so that said attentional subject will be located in the attentional area that is moved to a second position in the reference point movement range which is in point-symmetry relation to said first position across a center of said reference point movement range.

11. A recoding medium which stores a control program for displaying a video image to move a perspective of the image in a direction in which an attentional subject moves for displaying the attentional subject in an attentional area in the video image, said control program comprising the steps of:

transforming coordinates of the attentional subject in a three-dimensional coordinates system into coordinates there of in a plane field-of-view coordinate system;

deciding whether the attentional subject has moved out of said attentional area in the video image; and moving said attentional subject into said attentional area which is moved, when reference point of said attentional area has reached a boundary position of a reference point movement range, in which said reference point is movable, at the time said attentional subject is about to move out of said attentional area, so that said attentional subject will be located in the attentional area that is moved with the reference point there-of located in a first one divided radial areas of the reference point movement range other than a second one of the divided radial areas that is closet to said attentional subject.

12. An apparatus for displaying a video image, comprising:

image display means for displaying in the video image an attentional subject, an attentional area in which said attentional subject can freely move, said attentional area having a reference point fixed with respect to said attentional area, and a reference point movement range in which said reference point can move freely, the attentional subject being movable within a total movement range effected by a combined movement of said reference point within said reference point movement range and movement of the attentional subject within the attentional area, said total movement range thereby being defined by a sum of the attentional area and the reference point movement range; and control means for moving the perspective of said video image in a direction along which said attentional subject moves and moving the perspective of the video image and said attentional area so that said attentional subject will be located in a rear position which is opposite to said direction when said attentional subject is about to move out of said attentional area and said reference point is at a boundary position of said reference point movement range in said direction.

13. An apparatus for displaying a video image, comprising:

an image display device for displaying in the video image an attentional subject, an attentional area in which said attentional subject can freely move, said attentional area having a reference point fixed with respect to said attentional area, and a reference point movement range in which said reference point can move freely, the attentional subject being movable within a total movement range effected by a combined movement of said reference point within said reference point movement range and movement of the attentional subject within the attentional area, said total movement range thereby being defined by a sum of the attentional area and the reference point movement range; and a control device for moving the perspective of said video image in a direction along which said attentional subject moves and moving the perspective of the video image and said attentional area so that said attentional subject will be located in a rear position which is opposite to said direction when said attentional subject is about to move out of said attentional area and said reference point is at a boundary position of said reference point movement range in said direction.

14. An apparatus, comprising:

an image display device for displaying an attentional subject in an attentional area in the video image; and a control device for moving the perspective of the video image in the direction in which the attentional subject moves in the video image, and moving the perspective of the video image and the attentional area so that said attentional subject will be located in a rear position opposite to said direction in which the attentional subject moves, when said attentional subject is about to move out of said attentional area, wherein said control device includes:

coordinate transforming means for transforming coordinates of the attentional subject in a three-dimensional coordinate system into coordinates thereof in a plane field-of-view coordinate system;

coordinate holding means for holding coordinates of the attentional subject transformed by said coordinate transforming means before and after the attentional subject moves;

image display control means for displaying the attentional subject according to the coordinates transformed by said coordinate transforming means, together with a predetermined image, in the video image;

decision means for deciding whether the attentional subject has moved out of said attentional area in the video image;

calculating means for calculating a direction in which the attentional subject has moved based on the coordinates held by said coordinate holding means if the attentional subject has moved out of said attentional area; and image perspective moving means for controlling said image display control means to move the perspective of the video image and the attentional area so that the attentional subject will be located in the rear position opposite to the direction calculated by said calculating means.

15. A method of displaying a video image, comprising:

transforming coordinates of an attentional subject in a three-dimensional coordinate system into coordinates thereof in a plane field-of-view coordinate system;

holding transformed coordinates of the attentional subject before and after the attentional subject moves;

displaying the attentional subject according to the transformed coordinates, together with a predetermined image, in the video image;

deciding whether the attentional subject has moved out of said attentional area in the video image;

calculating a direction in which the attentional subject has moved based on the coordinates which are held, if the attentional subject has moved out of said attentional area; and moving the perspective of the video image and the attentional area so that the attentional subject will be located in a rear position opposite to the calculated direction, wherein a perspective of the image is moved in a direction in which the attentional subject moves when the attentional subject is about to move out of the attentional area.

16. A recording medium which stores a control program for displaying a video image, comprising:

transforming coordinates of an attentional subject in a three-dimensional coordinate system into coordinates thereof in a plane field-of-view coordinate system;

holding transformed coordinates of the attentional subject before and after the attentional subject moves;

displaying the attentional subject according to the transformed coordinates, together with a predetermined image, in the video image;

deciding whether the attentional subject has moved out of said attentional area in the video image;

calculating a direction in which the attentional subject has moved based on the coordinates which are held, if the attentional subject has moved out of said attentional area; and moving the perspective of the video image and the attentional area so that the attentional subject will be located in a rear position opposite to the calculated direction, wherein a perspective of the image is moved in a direction in which the attentional subject moves when the attentional subject is about to move out of the attentional area.

* * * * *